US006675323B2

(12) United States Patent
Bartenstein et al.

(10) Patent No.: US 6,675,323 B2
(45) Date of Patent: Jan. 6, 2004

(54) INCREMENTAL FAULT DICTIONARY

(75) Inventors: Thomas W. Bartenstein, Owego, NY (US); Douglas C. Heaberlin, Underhill, VT (US); Leendert M. Huisman, South Burlington, VT (US); Thomas F. Mechler, Essex Junction, VT (US); Leah M. P. Pastel, Essex, VT (US); Glen E. Richard, Essex Junction, VT (US); Raymond J. Rosner, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 09/682,456

(22) Filed: Sep. 5, 2001

(65) Prior Publication Data

US 2003/0046608 A1 Mar. 6, 2003

(51) Int. Cl.$^7$ ................................................ G06F 11/00
(52) U.S. Cl. ............................. 714/29; 714/25; 714/26; 714/32
(58) Field of Search ............................. 714/29, 25, 32, 714/37, 33, 26, 741

(56) References Cited

U.S. PATENT DOCUMENTS

| | | | | |
|---|---|---|---|---|
| 4,228,537 A | * | 10/1980 | Henckels et al. | 714/33 |
| 4,242,751 A | * | 12/1980 | Henckels et al. | 714/737 |
| 5,293,387 A | * | 3/1994 | Booth | 714/737 |
| 5,390,193 A | * | 2/1995 | Millman et al. | 714/741 |
| 5,475,624 A | * | 12/1995 | West | 703/15 |
| 5,570,376 A | * | 10/1996 | Kunda et al. | 714/736 |
| 5,663,967 A | * | 9/1997 | Lindberg et al. | 714/737 |
| 2002/0011827 A1 | * | 1/2002 | Ishida et al. | 324/71.5 |

FOREIGN PATENT DOCUMENTS

| | | | | |
|---|---|---|---|---|
| JP | 10104319 | * | 4/1998 | G01R/31/28 |
| JP | 2000338184 | * | 12/2000 | G01R/31/28 |

OTHER PUBLICATIONS

Chess, Brian, Tracy Larrabee. Creating Samll Fault Dictionaries. Mar. 1999. vol. 18, No. 3. pp. 346–356.*
Boppana, Vamsi, W. Kent Fuchs. Fault Dictionary Compaction by Output Sequence Removal. ACM. 1994. pp. 576–579.*
Kirkland, Larry, R. Glenn Wright. The Infusion of LASAR into VXI or how to Utilize Fault Dictionary Techniques in an Open System. IEEE. 1997. pp. 367–370.*

* cited by examiner

Primary Examiner—Robert Beausoliel
Assistant Examiner—Yolanda L Wilson
(74) Attorney, Agent, or Firm—Scully, Scott, Murphy & Presser; Robert A. Walsh, Esq.

(57) ABSTRACT

An incremental fault dictionary in which the diagnostic simulation results of current tests are stored for future use. Diagnostic simulation results are incrementally added to the fault dictionary, and information in the incremental fault dictionary is used to avoid expensive redundant fault simulations. The size of the incremental fault dictionary is maintained within user definable bounds by identifying and deleting faults that need not be maintained in the incremental fault dictionary. The incremental fault dictionary beneficially provides more accurate and faster diagnostics than a typical prior art diagnostic fault simulation.

7 Claims, 2 Drawing Sheets

INCREMENTAL FAULT DICTIONARY

BACKGROUND OF THE INVENTION

1. Field of the Invention

The present invention relates generally to incremental fault dictionaries, and more particularly pertains to an incremental fault dictionary in which the diagnostic simulation results of current tests are stored for future use.

Diagnostic simulation results are incrementally added to the incremental fault dictionary, and information therein is used to avoid expensive redundant fault simulations. The size of the incremental fault dictionary is maintained within user definable bounds by identifying and deleting faults that need not be maintained in the incremental fault dictionary. The incremental fault dictionary beneficially provides more accurate and faster diagnostics than a typical prior art diagnostic fault simulation.

2. Discussion of the Prior Art

The use of fault dictionaries is well documented in the literature (see, for example, "Diagnosis and Reliable Design of Digital Systems," by Melvin A. Breuer and Arthur D. Friedman.) A fault dictionary is a large table that lists for each test pattern and each fault from some master fault list how the response of the design with that fault present differs from the response of the fault-free design. The dictionary is generated prior to diagnosing an IC, and is used to compare the observed behavior of the IC with the stored behaviors of the same with any of the faults listed in the dictionary. It is static in the sense that, once generated, no further information is added.

The main problem with prior art static fault dictionaries is that they are typically so large that they cannot be stored in a reasonable size memory or be made accessible in a reasonable manner. The present invention avoids the size problem by storing and retaining in an incremental fault dictionary only that information and data that has proven to be useful.

SUMMARY OF THE INVENTION

Accordingly, it is a primary object of the present invention to provide an incremental fault dictionary which beneficially provides more accurate and faster diagnostics than a typical prior art diagnostic fault simulation, and an incremental fault dictionary which optimizes diagnostic simulation performance versus space consumed by the incremental fault dictionary.

BRIEF DESCRIPTION OF THE DRAWINGS

The foregoing objects and advantages of the present invention for an incremental fault dictionary may be more readily understood by one skilled in the art with reference being had to the following detailed description of several preferred embodiments thereof, taken in conjunction with the accompanying drawings wherein.

DETAILED DESCRIPTION OF THE INVENTION

Figure 1:
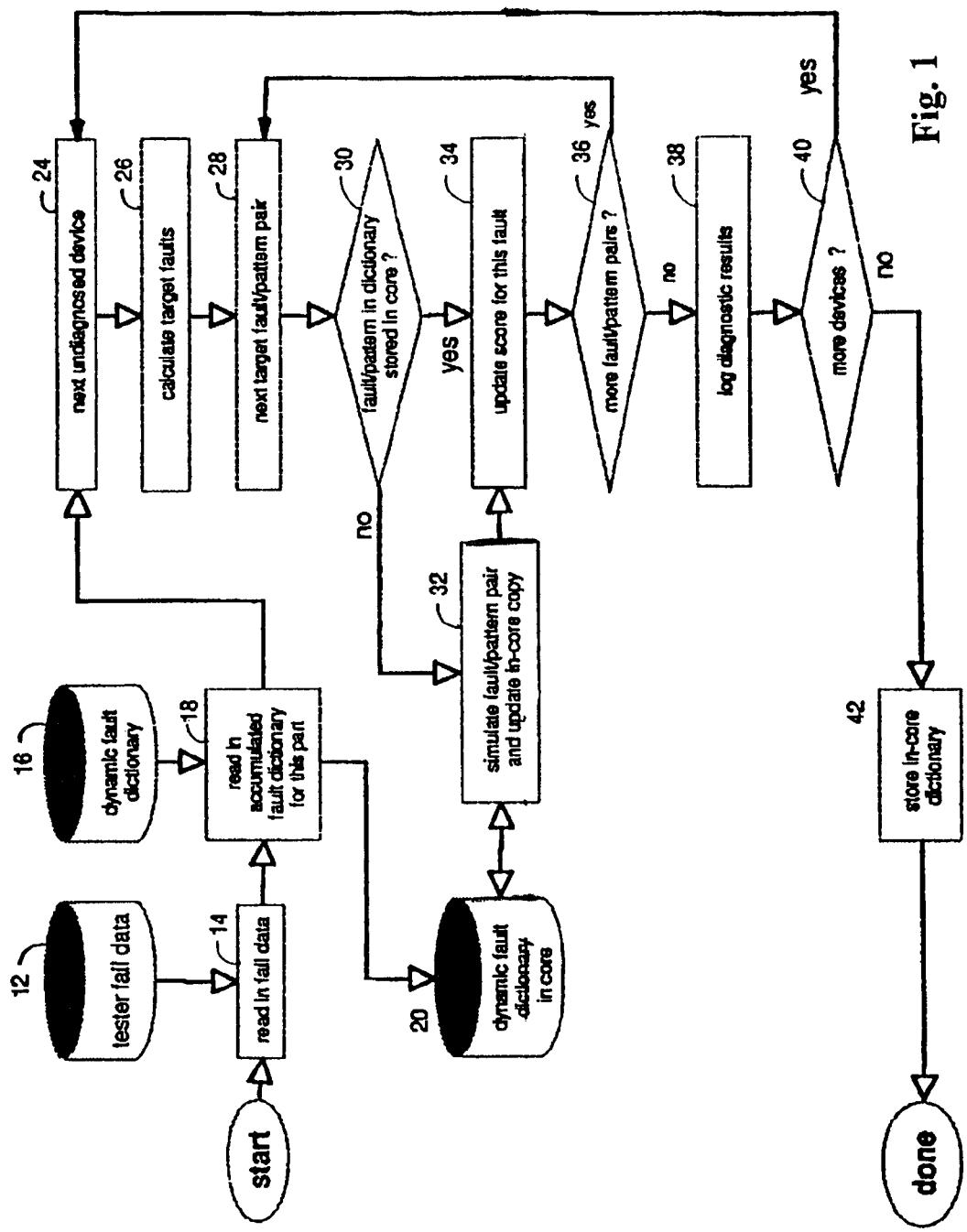
FIG. 1 illustrates a logic flow diagram of a diagnostic method in which diagnostic simulation results of current tests are stored in an incremental fault dictionary, and information in the incremental fault dictionary is used to avoid expensive redundant fault simulations.

When analyzing fail data associated with failing devices, the diagnostic software often repeats previous work, i.e. runs a redundant diagnostic simulation of the same faults. The diagnostic simulations run by state-of-the-art diagnostic software are very time consuming and expensive, and it would be very beneficial if previous diagnostic experiences could be placed in memory in an incremental fault dictionary and used in future diagnoses.

The present invention is directed to a diagnostic method or process in which the diagnostic simulation results of current tests are stored in an incremental fault dictionary for future use. Diagnostic simulation test results are incrementally added to the fault dictionary, and information in the incremental fault dictionary is used to avoid expensive redundant fault simulations. The size of the incremental fault dictionary is maintained within user definable bounds by identifying faults that need not be maintained in the incremental fault dictionary.

A typical integrated circuit comprises logic circuits which include latches at various stages thereof which are memory units which store logic values. The latches are used in a diagnostic simulation to check the stored logic values against expected logic values when the logic circuits are functioning properly.

During test, test patterns are applied to an integrated circuit and, after each such application, the contents of the latches are compared with the expected values. If there is a mismatch, the pattern is called a failing pattern, and the latches where such mismatches are found are stored in a file for use in subsequent diagnosis.

Assuming that a failing device has been targeted for diagnosis, the present invention uses a diagnostic method with the following steps:

1. Analyze the fail data, that is, the list of failing patterns as well as, for each failing pattern, the list of latches where mismatches were found, associated with the failing device, and identify those possible faults that could have caused any or all of those fails. The faults are taken from master fault list and, possibly, from any auxiliary fault lists. A master fault list is a fault list used by the automatic test pattern generation program, and contains target faults for automatic test pattern generation. An auxiliary fault list is a list of faults not in the master fault list, but which can be used during the diagnostics in addition to the faults in the master fault list.

2. Of those faults identified in the previous step, do not repeat the faults that have already been simulated for any of the failing patterns, and whose corresponding mismatching latches are stored in the incremental fault dictionary. Fault simulate only those faults and failing patterns for which there is no information in the incremental fault dictionary.

3. Complete the present diagnosis for the failing device. This may include a more sophisticated analysis in which shorts, or other more complex faults, are employed. Such faults are taken from the auxiliary fault list, or, if not available otherwise, constructed during diagnosis and added to the auxiliary fault list.

4. If the resulting incremental fault dictionary has become too large, remove fault/pattern pairs that meet certain user definable criteria. Such removal can be done, for example, any time new data needs to be added to the fault dictionary.

The criteria for the removal of fault information from the incremental fault dictionary could include:

a count of the number of times a fault is encountered;

a fault's last date of use;

the amount of space required to store a particular fault/pattern entry;

the cost associated with regenerating that entry if needed again later.

5. Store the augmented incremental fault dictionary.

The dictionary described so far contains only the minimal amount of information required for its function. There is of course no problem storing additional information (and removing it when more storage space is needed,) that could beneficially be used during diagnosis. Some examples of such additional information are discussed below.

Since on any given pattern most faults are not detectable, a common entry for an incremental fault dictionary is that a simulated fault causes no fails for the pattern in question. This information consumes relatively little space, and could be represented by, for example, two bits by making the pattern number implicit, yet generally saves as much diagnostic simulation effort as a fault which fails many latches. Accordingly, these entries are preferably retained indefinitely. An incremental fault dictionary which indicates only which fault/pattern combinations produce no fails could save a lot of simulation time in determining which faults match a given fail signature.

The incremental fault dictionary could also store the physical locations of the nets or pins where successful faults reside (that is, faults that explained all of the observed data exactly.) Also, correspondences between the logical and physical names of such nets could be stored An incremental fault dictionary could be subdivided based upon the nature of the net/pins in the diagnostic call. Nets are conductive leads between transistor elements, and pins provide connections to the various transistor elements and circuit locations. For example, an incremental fault dictionary could be created for BEOL (Back End Of Line) related fail data or FEOL (Front End Of Line) related fail data.

An example of the case in which the cost of generating the diagnostic information is high is hyperactive faults. These are faults that cause a lot of activity in the simulator and consume a lot of memory storage. These hyperactive faults are usually dropped from a diagnostic simulation once their associated fault machine grows too large. The normal information on these hyperactive faults cannot easily be retained in the incremental fault dictionary (since the diagnostic simulator doesn't retain them long enough to determine which fails they cause), and such faults would thus be resimulated on chip after chip, only to be dropped each time. A typical hyperactive fault is a clock fault which causes and results in a large number of other errors throughout the failing device.

The incremental fault dictionary could handle such hyperactive faults as follows.

Whenever a fault is dropped due to the large size of its associated fault machine, create an entry in the incremental fault dictionary that indicates that the fault is hyperactive on that pattern. These entries should preferably never be deleted from the incremental fault dictionary as they consume very little space and are expensive to regenerate. Simulation of these hyperactive faults can be avoided in subsequent runs, even though (as with a normal diagnostic simulation today), information cannot be provided about how well they match the fail signature.

The incremental fault dictionary could account for fail results for hyperactive faults by performing one very expensive simulation run designed specifically for faults identified as hyperactive, with the machine size set being as large as possible. These hyperactive fault entries are also preferably never removed.

FIG. 1 illustrates a logic flow diagram of a diagnostic method in which diagnostic simulation results of current tests are stored in an incremental fault dictionary, and information in the incremental fault dictionary is used to avoid expensive redundant fault simulations.

Initially, the tester fail data at 12 is entered into the computer system at 14, and then the dynamic fault dictionary at 16 is entered at 18 for the failing device targeted for diagnosis, and is also entered into the dynamic fault dictionary in-core at 20. Proceed for the first undiagnosed device at 24. Target faults are calculated at 26 by determining which faults from the master fault list and the auxiliary fault lists could possibly have caused the fails observed at the tester. Then at 28 and 30 the first fault/pattern is checked to determine if the fault/pattern is stored in the dictionary in-core.

If no at step 30, then at 32 simulate the fault/pattern and update the in-core copy at 20, and at 34 update the count/score for this fault. If yes at step 30, then retrieve information from dictionary 20 and update the count/score for this fault at 34. Check at 36 if there are additional fault/pattern pairs to be processed, and if yes, return to step 28 and repeat steps 28, 30, 32 and 34 for each additional fault/pattern pair. If no at 36, then at 38 log the diagnostic results.

Check at 40 if there are additional devices to be processed, and if yes, return to step 24 and repeat steps 24 through 38 for the additional devices.

If the check at 40 is no, then store the in-core dictionary at 42.

Figure 2:
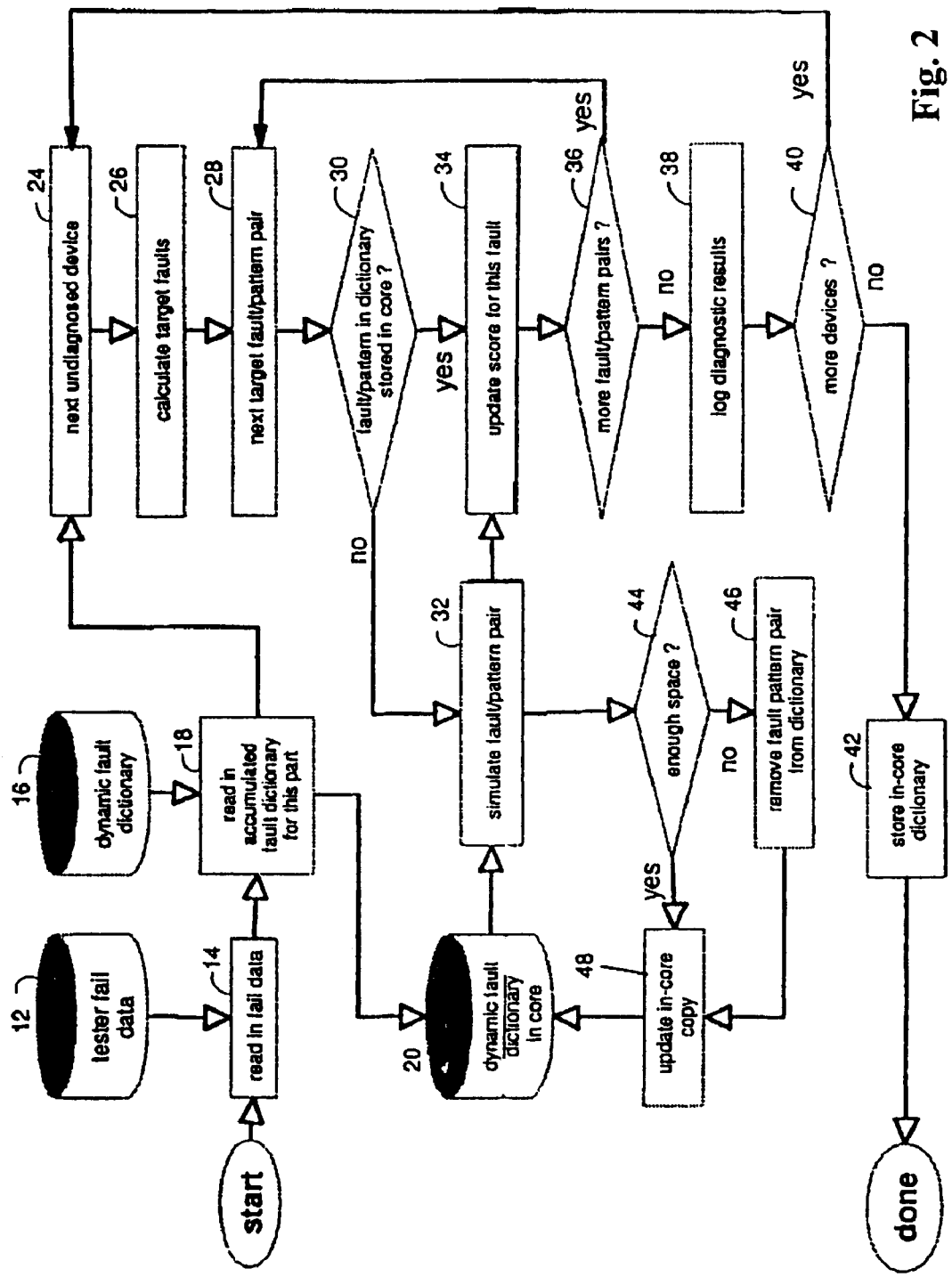
FIG. 2 is a logic flow diagram on the steps and decisions involved in removing faults from the incremental fault dictionary.

FIG. 2 is a logic flow diagram on the steps and decisions involved in removing faults from the incremental fault dictionary.

Follow the same flow as in FIG. 1, but, instead of updating the in-core copy at 32, verify in 44 that there is enough space in the dictionary. If there is enough space, update the in-core copy in 48. If there is not enough space, first remove in 46 one or more entries in the in-core copy 20, according to suitable user defined criteria like the ones outlined above, and then, in 48, store the results obtained in 32.

While several embodiments and variations of the present invention for an incremental fault dictionary are described in detail herein, it should be apparent that the disclosure and teachings of the present invention will suggest many alternative designs to those skilled in the art.

What is claimed is:

1. A diagnostic method in which diagnostic simulation results of current tests are stored in an incremental fault dictionary, and information in the incremental halt dictionary is used to avoid expensive redundant fault simulations, comprising: for faults associated with a failing device, perform fault simulations of failing patterns, while not repeating fault simulations of faults that have already been simulated for any of the failing patterns and whose corresponding results are stored in the incremental fault dictionary, and complete the current diagnosis for the failing device, add the diagnostic simulation results for the current diagnosis to the incremental fault dictionary if not already stored in the dictionary, and identifying less needed faults or fault/pattern pairs and removing the identified less needed faults or fault/pattern pairs from the resulting incremental fault dictionary if the resulting incremental fault dictionary has become too large.

2. The diagnostic method of claim 1, wherein criteria for identification and removal from the incremental fault dictionary include a count of the number of times a fault is encountered, a fault's last date of use, the amount of space required to store a particular fault/pattern entry, and the cost associated with regenerating that entry if needed again.

3. The diagnostic method of claim 1, wherein a fault is identified as hyperactive and removed when associated fault machine size becomes too large, and permanent entry is entered in the incremental fault dictionary which indicates that that fault is hyperactive on that pattern.

4. A diagnostic method in which diagnostic simulation results of current tests are stored in an incremental fault dictionary, and information in the incremental fault dictionary is used to avoid expensive redundant fault simulations, comprising: for faults associated with a failing device, perform fault simulations of failing patterns, while not repeating fault simulations of faults that have already been simulated for any of the failing patterns wherein faults are taken from a master fault list and from possible auxiliary fault lists that are produced during previous diagnoses and whose corresponding results are stored in the incremental fault dictionary, and complete the current diagnosis for the failing device, and add the diagnostic simulation results for the current diagnosis to the incremental fault dictionary if not already stored in the dictionary.

5. A diagnostic method in which diagnostic simulation results of current tests are stored in an incremental fault dictionary, and information in the incremental fault dictionary is used to avoid expensive redundant fault simulations, comprising: for faults associated with a failing device, perform fault simulations or failing patterns, while not repeating fault simulations of faults that have already been simulated for any of the failing patterns and whose corresponding results are stored in the incremental fault dictionary, and complete the current diagnosis for the failing device, add the diagnostic simulation results for the current diagnosis to the incremental fault dictionary if not already stored in the dictionary, and storing in the incremental fault dictionary the physical locations of the nets that are called out in the diagnosis, as well as the correspondence between the logical and physical netnames.

6. A diagnostic method in which diagnostic simulation results of current tests are stored in an incremental fault dictionary, and information in the incremental fault dictionary is used to avoid expensive redundant fault simulations, comprising: for faults associated with a failing device, perform fault simulations of failing patterns, while not repeating fault simulations of faults that have already been simulated for any of the failing patterns and whose corresponding results are stored in the incremental fault dictionary which is subdivided based upon the physical nature of the net/pins in a diagnosis, and complete the current diagnosis for the failing device, add the diagnostic simulation results for the current diagnosis to the incremental fault dictionary if not already stored in the dictionary.

7. A diagnostic method in which diagnostic simulation results of current tests are stored in an incremental fault dictionary, and information in the incremental fault dictionary is used to avoid expensive redundant fault simulations, comprising: for faults associated with a failing device, perform fault simulations of failing patterns, while not repeating fault simulations of faults that have already been simulated for any of the failing patterns and whose corresponding results are stored in the incremental fault dictionary, entering in the incremental fault dictionary an entry that a simulated fault produced no fails, or that a fault/pattern combination produced no fails far that pattern and complete the current diagnosis for the failing device, add the diagnostic simulation results for the current diagnosis to the incremental fault dictionary if not already stored in the dictionary.

* * * * *